(12) United States Patent
Wood et al.

(10) Patent No.: US 8,606,432 B1
(45) Date of Patent: Dec. 10, 2013

(54) DEPTH HIGHLIGHT, DEPTH HIGHLIGHT RANGE, AND WATER LEVEL OFFSET HIGHLIGHT DISPLAY AND SYSTEMS

(71) Applicants: Michael Wesley Wood, Cushing, MN (US); Jeffrey Earl Smith, Farmington, MN (US)

(72) Inventors: Michael Wesley Wood, Cushing, MN (US); Jeffrey Earl Smith, Farmington, MN (US)

(73) Assignee: Johnson Outdoors Marine Electronics, Inc., Eufaula, AL (US)

( * ) Notice: Subject to any disclaimer, the term of this patent is extended or adjusted under 35 U.S.C. 154(b) by 0 days.

(21) Appl. No.: 13/904,709

(22) Filed: May 29, 2013

Related U.S. Application Data

(63) Continuation of application No. 12/833,919, filed on Jul. 9, 2010, now Pat. No. 8,463,458.

(60) Provisional application No. 61/239,715, filed on Sep. 3, 2009, provisional application No. 61/239,717, filed on Sep. 3, 2009.

(51) Int. Cl.
*G06T 11/20* (2006.01)

(52) U.S. Cl.
USPC .......................................... 701/2

(58) Field of Classification Search
USPC ............................ 701/2; 345/442
See application file for complete search history.

(56) References Cited

U.S. PATENT DOCUMENTS

| | | | |
|---|---|---|---|
| 4,428,052 A * | 1/1984 | Robinson et al. ............ | 701/117 |
| 4,597,069 A | 6/1986 | Milano et al. | |
| 5,172,324 A | 12/1992 | Knight | |
| 5,268,844 A | 12/1993 | Carver et al. | |
| 5,309,408 A | 5/1994 | Bick et al. | |
| 5,362,263 A * | 11/1994 | Petty ................................. | 440/1 |
| 5,386,368 A | 1/1995 | Knight | |
| 5,400,300 A * | 3/1995 | Bick et al. ...................... | 367/99 |
| 5,546,695 A * | 8/1996 | Langer ........................ | 43/44.98 |
| 5,884,213 A | 3/1999 | Carlson | |
| 6,171,021 B1 * | 1/2001 | Feldtmann ..................... | 405/15 |
| 6,208,758 B1 | 3/2001 | Ono et al. | |
| 6,256,585 B1 | 7/2001 | Shannon | |
| 6,750,815 B2 * | 6/2004 | Michaelson et al. ...... | 342/357.31 |
| 6,873,570 B2 | 3/2005 | Zhu et al. | |
| 6,934,608 B2 | 8/2005 | Qureshi | |
| 6,934,657 B1 | 8/2005 | Carlson et al. | |
| 7,124,022 B2 | 10/2006 | Carmichael et al. | |
| 7,209,829 B2 | 4/2007 | Litvack et al. | |
| 7,266,532 B2 | 9/2007 | Sutton et al. | |
| 7,268,703 B1 | 9/2007 | Kabel et al. | |
| 7,313,404 B2 | 12/2007 | Anderson | |
| 7,769,504 B2 | 8/2010 | Kaji | |
| 7,940,602 B1 | 5/2011 | Korolenko | |
| 8,296,001 B1 | 10/2012 | Kabel et al. | |
| 2004/0249860 A1 * | 12/2004 | Stechschulte et al. ..... | 707/104.1 |
| 2006/0089794 A1 | 4/2006 | DePasqua | |
| 2009/0037040 A1 | 2/2009 | Salmon et al. | |

(Continued)

OTHER PUBLICATIONS

U.S. Appl. No. 13/110,587, filed May 18, 2011, Wood et al.

(Continued)

*Primary Examiner* — Thomas Tarcza
*Assistant Examiner* — Alex C Dunn
(74) *Attorney, Agent, or Firm* — Reinhart Boerner Van Deuren P.C.

(57) ABSTRACT

A digital mapping display and related system for fishing, and other applications.

9 Claims, 14 Drawing Sheets

(56) References Cited

U.S. PATENT DOCUMENTS

| | | |
|---|---|---|
| 2009/0067750 A1* | 3/2009 | Pryszo et al. ............... 382/294 |
| 2009/0069962 A1 | 3/2009 | Aharon et al. |
| 2009/0147623 A1 | 6/2009 | Betts et al. |
| 2010/0131133 A1 | 5/2010 | Koda et al. |
| 2011/0054784 A1 | 3/2011 | Wood et al. |
| 2011/0054785 A1 | 3/2011 | Wood et al. |
| 2011/0258901 A1* | 10/2011 | Garrett ............... 43/4.5 |
| 2012/0015566 A1 | 1/2012 | Salmon |
| 2012/0232719 A1* | 9/2012 | Salmon et al. ............... 701/2 |

OTHER PUBLICATIONS

U.S. Appl. No. 13/904,763, filed May 29, 2013, Wood et al.

* cited by examiner

Figure 9 Example of WLO adjusted to a negative 7-feet

DEPTH HIGHLIGHT, DEPTH HIGHLIGHT RANGE, AND WATER LEVEL OFFSET HIGHLIGHT DISPLAY AND SYSTEMS

CROSS-REFERENCE TO RELATED PATENT APPLICATIONS

This patent application is a continuation of co-pending U.S. patent application Ser. No. 12/833,919, filed Jul. 9, 2010, which claims the benefits of U.S. Provisional Patent Applications Nos. 61/239,715 and 61/239,717, each of which were filed Sep. 3, 2009, the teachings and disclosure of which are incorporated herein in their entireties by reference thereto.

BACKGROUND OF THE INVENTION

According to the present invention, techniques for digital mapping are provided. In particular, the present invention provides methods, devices, and systems for displaying selected features on the chart of a body of water and associated areas. More particularly, the present invention provides systems, methods, codes, and devices for selectively highlighting one depth or one or more ranges of contiguous depths on the chart of a body of water or varying the depth values for contour lines on such chart on the display of a Global Positioning System (GPS) or coupled to a device of the GPS. As an example, ProMap Technologies, Inc., dba; LakeMaster-Lake Maps has developed a Chart Library and API that allows GPS manufacturers to embed the API into their OS and thus display proprietary LakeMaster Digital Charts. These LakeMaster Digital Charts reside on a secure SD media card in a format compatible through the API with various GPS Devices. Of course, there can be other variations, modifications, and alternatives.

GPS and underwater sounding devices (SONAR) have made access to navigational charts more readily availability to the angler. Newer charts created with modern technology reach accuracies of within less than one foot for location and depth. Such accuracies allow the creating of highly accurate marine charts capable of depicting the lake bottom in a manner imitating photographic imagery. GPS devices standing alone or coupled with SONAR units have opened a whole new dimension of information available to mariners, anglers and recreational boaters. Data collected during the mapping process has expanded to include not only bottom depth but bottom composition, hardness light penetration, weed growth, periodic tidal or random water level changes together with currents to name some examples.

Although highly successful, GPS devices alone or with SONAR units still have limitations. As an example, such devices are often cumbersome and lack easy to use functions. Without accurate charts that provide easy access to the information they can provide, GPS devices can do little more than allow you to find a previously known point. With accurate charts and user friendly ways to sort and present the information they contain, GPS devices can open entire new worlds of information. Conventional GPS display presentations tend to be static. That is to say, they present information in the same fashion as traditional paper maps. There is no ability to highlight particular features or change the way the chart is presented. Moreover, the conventional GPS device fails to provide ways to modify and display chart data to reflect real time conditions encountered by the user. Additionally, the conventional units do not provide a user with the ability to modify the GPS chart display to reflect potential changes in conditions such as water depth that have or may occur on the water body since the chart was produced.

From the above, it is seen that techniques for improving how GPS and SONAR units present their data are highly desirable.

BRIEF SUMMARY OF THE INVENTION

According to the present invention, techniques for digital mapping are provided. In particular, the present invention provides methods, devices, and systems for displaying selected features of the chart of a body of water and associated areas. More particularly, the present invention provides systems, methods, codes, and devices for selectively highlighting one depth or one or more range of contiguous depths on the chart of a body of water or varying the depth values for contour lines on such chart on the display of a GPS device or GPS. As an example, ProMap Technologies, Inc., dba Lake-Master Lake Maps, has developed a Chart Library and API that allows GPS manufacturers to embed the API into their OS and thus display proprietary LakeMaster® Digital Charts. These LakeMaster Digital Charts reside on a secure SD media card in a format compatible through the API with various GPS devices. Of course, there can be other variations, modifications, and alternatives.

In a specific embodiment, the present invention provides a method to graphically output a depiction of one or more selected areas of a body of water to the display of a (GPS) device. In a specific embodiment, the display may be coupled to a GPS device, plotter or other device containing or providing GPS functions and a visual display. The method includes providing at least one chart of one or more regions of a body of water. In a specific embodiment, the chart comprises a plurality of bottom depths below a surface of the one or more regions of the body of water. Preferably, the chart is configured to be output on the display. The method includes selecting at least one depth to be highlighted on the display simultaneously with the remainder of the chart. The method processes information associated with the selected depth with information from the chart to identify and highlight the selected depth according to a specific embodiment. The method then outputs one or more indications associated with the one or more regions on the display to highlight the one or more regions of contiguous depth ranges comprising the structure within the vicinity of the selected depth. In other embodiments, the one or more regions may be absent of any structure, such as a flat bottom or other like region. As used herein, the term "structure" generally means a distinct and/or identifiable change from a surrounding region or area according to at least one embodiment. As an example, the structure can include a hump, bump, rock, tree, certain change in depth, weed, tree, vegetation, submerged finger of land, submerged channel, canal, or river bottom, any combinations, and the like. Of course, one of ordinary skill in the art would recognize other meanings for the term structure without departing from the scope of the claims herein.

In such embodiments, the method also processes information associated with a selected range of depths with information from the chart to identify the specific range of contours comprising an area of interest within the region of selected depths to be highlighted to a specific embodiment. The method then outputs the one or more regions of contiguous depth ranges comprising the area of interest within the vicinity of the selected depths to a display.

In an alternative specific embodiment, the present invention provides a system for displaying a graphical output of one or more selected areas of a body of water. The system includes one or more computer readable memories that have computer code or codes. The memories include one or more codes directed to at least one chart of one or more regions of a body of water. In a preferred embodiment, the chart comprises a plurality of bottom depths below a surface of the one or more regions of the body of water. The chart is configured to be output on a display. The memories also include one or more codes directed to receiving information associated with at least one depth to be highlighted on the display simultaneously with the remaining chart data.

Still further, the present invention provides a mapping system comprising a display device coupled to a GPS. The display device comprises one or more computer readable memories including various codes. The memory includes a code directed to selecting a chart from a plurality of charts to be displayed. In a specific embodiment, the selected chart includes a representation of a body of water and a plurality of labels indicative of a plurality of depths for the representation of the body of water. Preferably, at least one of the plurality of labels is a first zero depth label representing a first shoreline for the body of water. The memory also includes a code directed to highlight a contour line from a plurality of contour lines on the selected chart and a code directed to highlight a range of contour lines or a portion of contour lines from the selected chart. In a specific embodiment, the memory also includes a code directed to output a resulting chart representative of a second zero depth label representing a second shoreline for the body of water such that the second shoreline is indicative of a change in height of a surface of the body of water.

In an alternative specific embodiment, the present invention provides a system for displaying a graphical output of one or more selected areas of a body of water. The system includes one or more computer readable memories that have computer code or codes. The memories include one or more codes directed to processing information associated with a selected range of depths with information from the chart to identify one or more regions comprising a contiguous range of depths. One or more codes are directed to outputting one or more indications associated with the one or more regions on the display to highlight the one or more regions comprising the contiguous range of selected depths to a display. Of course, there can be other codes to enable the functionality described herein, and combinations of features outside of the present specification.

In an alternative embodiment, the present invention provides a system for displaying a graphical output of one or more selected areas of a body of water. The system includes a display, e.g., flat panel, light emitting diode, liquid crystal display. The system has one or more graphical representations of one or more regions of a body of water. The system also has one or more labeled contour lines representative of an interface between land and the one or more regions of the body of water in one or more embodiments. A plurality of labeled contour lines is representative of respective plurality of bottom depths below the surface of the one or more regions of the body of water in a specific embodiment. The system also has a highlighted region between a first depth and a second depth within the plurality of depths in a specific embodiment. The highlighted region is representative of an active fish zone based upon a selected depth.

In a specific embodiment, the present invention provides a method to graphically output a depiction of one or more selected areas of a body of water together with adjacent contiguous land surface areas above the water surrounding said water body to the display of a (GPS) device. The display is coupled to a GPS plotter according to a specific embodiment. The method includes providing at least one chart of one or more regions of a body of water. The chart comprises a plurality of bottom depths below a surface of the one or more regions of the body of water together with land surface adjacent to the body of water. The chart is configured to be output on the display. In a specific embodiment, the method includes selecting a value, positive or negative, by which to modify the depth labels of the bottom depths (contours) and modify the output on the display of adjacent land surface associated of the one or more regions of the body of water on the display. The method includes processing information associated with the selected value with information from the chart to modify the depth labels associated the bottom depths, e.g., contours, and to modify the depiction of previously exposed adjacent land surface as submerged for positive inputted values or previously submerged lake bottom as exposed land surface for negative inputted values. The method outputs one or more indications associated with the one or more regions on the display to display modified depth labels and highlight the one or more regions of now exposed land surface.

Moreover, the present invention provides a system for mapping coupled to a GPS in a specific embodiment. The system includes a computer readable memory or memories including various codes. A code is directed to retrieving a chart in a first format having a first set of attributes (e.g., contour lines, structure, color) corresponding to a first water level of the body of water. A code is directed to receiving a value representative of an off-set in a positive or negative direction. In a preferred embodiment, the off-set is indicative of a change in a water level of the body of water. The memory or memories also include a code directed to process the value with information from the chart and a code directed to output a second chart in a second format having a second set of attributes corresponding to a second water level representative of the value of the off-set. In a preferred embodiment, the second set of attributes comprises a second set of depth labels indicative of the second water level. The output of the second chart comprises modifying one or more indications representative of the second water level.

In a specific embodiment, the present invention provides an alternative method to graphically output a depiction of one or more selected areas of a body of water together with adjacent contiguous land surface areas above the water surrounding said water body to the display of a GPS device, which may be coupled to SONAR or a fish finder unit. The method includes retrieving positional information from a global positioning system, which may be from satellite communication or other position information provided by a user through a human interface device. The method includes providing at least one chart out of a plurality of charts of one or more regions of a body of water using the positional information. The chart has a plurality of bottom depths below a surface of the one or more regions of the body of water in a specific embodiment. The chart is configured to be output on the display. The method includes selecting at least one depth to be highlighted simultaneously with the chart on the display in a specific embodiment. Optionally, the method includes determining (e.g., caught fish) a depth to be highlighted. The selecting occurs using a user interface, e.g., touch screen, slide bar, key, or others. The method includes processing information associated with the selected depth with information from the chart to identify one or more regions comprising a structure within a vicinity of the selected depth in a specific embodiment. The method also includes outputting one or more indications associated with the one or more regions on the display to highlight the one or more regions of contiguous depth ranges comprising the range of selected depths. Of course, there can be other variations, modifications, and alternatives.

Many benefits are achieved by way of the present invention over conventional techniques. In one or more embodiments, the present invention provides for improved display features coupled to a GPS device. In other embodiments, the present method and system may be configured on commercial fish finders. The present invention provides a user friendly method of customizing a chart display in real time to reflect current physical characteristics of the water body. Depths may be dynamically adjusted to allow for changing water lever conditions. Specific physical features of interest to the user can be highlighted in real time based on user inputs. Because the display is controlled by user input, rather than relying on predetermined parameters, broader flexibility for display of charts can be achieved thereby greatly expanding the utility of digital GPS charting in general. Further benefits can be achieved by allowing user to create artificial conditions and display possible results for different field conditions. Physical characteristics of a water body can then be viewed displaying the dynamically created conditions prior to their actual occurrence, allowing users to adjust strategies accordingly. All or at least one of these benefits can be applied to locations other than the current position of the GPS device in addition to its current position. Depending upon the embodiment, one or more of these benefits may be achieved. These and other benefits will be described in more detail throughout the present specification and more particularly below.

Various additional objects, features and advantages of the present invention can be more fully appreciated with reference to the detailed description and accompanying drawings that follow.

DETAILED DESCRIPTION OF THE INVENTION

Figure 1:
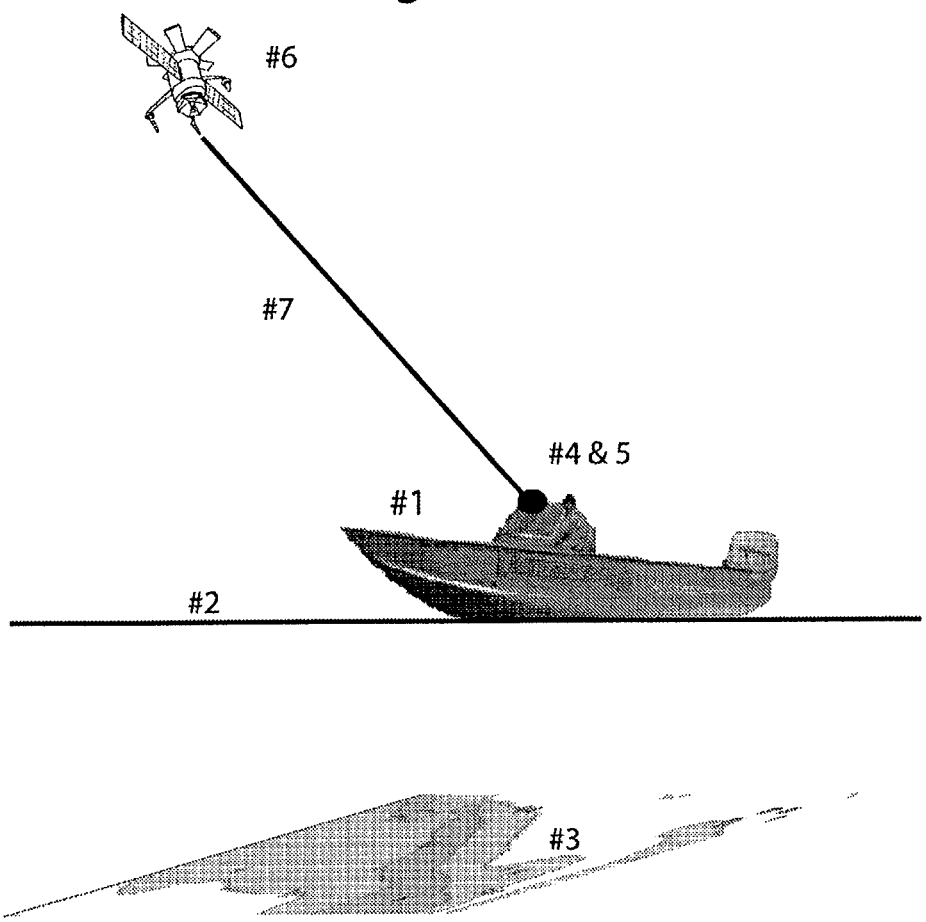
FIG. 1 is a simplified diagram of a vessel with a GPS Display Device apparatus according to an embodiment of the present invention.

According to the present invention, techniques for digital mapping are provided. In particular, the present invention provides methods, devices, and systems for displaying selected features on the chart of a body of water and associated areas. More particularly, the present invention provides systems, methods, codes, and devices for selectively highlighting one depth or one or more ranges of contiguous depths on the chart of a body of water or varying the depth values for contour lines on such chart on the display of a Global Positioning System (GPS) or coupled to a device of the GPS. As an example, ProMap Technologies, Inc., dba; LakeMaster-Lake Maps has developed a Chart Library and API that allows GPS manufacturers to embed the API into their OS and thus display proprietary LakeMaster Digital Charts. These LakeMaster Digital Charts reside on a secure SD media card in a format compatible through the API with various GPS Devices. Of course, there can be other variations, modifications, and alternatives.

To assist the reader in understand the following description, the following definitions have been provided. Of course, these definitions are not intended to be limiting and are merely examples.

"API" means application programming interface.

"Chart or alternatively Map" means the individual image to be displayed on a GPS Display Device. The chart may be composed from either vector or raster graphical sources. The vector based chart would be composed from encoded vectors and points arranged into a chart image with specifically encoded components which can be manipulated according to user inputs to achieve the modifications of a visual display controlled by the user and displayed on a GPS device at its true geographical world coordinate(s). The raster chart may be composed as a fixed image or as in this embodiment may be dissected into pixels, lines or polygons of varying colors. Those individual components of the raster image are then encoded thus creating an image which can be manipulated according to user inputs to achieve the modifications of a visual display controlled by the user and displayed on a GPS device at its true geographical world coordinate(s). Of course, there can be other meanings consistent with those known by one of ordinary skill in the art.

"Chart Library" means a collection of subroutines and/or routines that contain code, images and data to provide services to independent programs.

"Contour Line" means one or more lines depicting a contiguous or semi-contiguous area of the bottom of a water body being at the same depth below the surface or a line depicting a transition between two differing areas of bottom composition, bottom hardness, weed growth or current flow.

"GPS device" means Global Positioning System capable of using satellite signals to locate the current position of the GPS device or a location selected by a user and providing a positional related output to create a visual representation of specified geographic locations coupled with a map of the surrounding area.

"GPS/Sonar Combination Unit" (Combo Unit) means one or more configurations of GPS devices with visual displays capable of displaying inputs from GPS and Sonar units on a single integrated display.

"GPS Display Device" means a visual display device in one or more configurations of GPS or Combo unit.

"Map Media Cards" means any form of electronic media mass storage device or media card capable of storing digital information and allowing access to such information by a digital processor.

"Human Interface" means any method by which a human user is able to input specific values (data) into a GPS device to among other functions dynamically change the appearance of the visual display in a predetermined manner or provide other user inputs necessary to manipulating the visual image of a chart on the display of the GPS device.

"Shaded" means cross-hatch, dotted, or other fill methods for regions and any and all forms of line or shading depiction.

"Raster" and "Vector" relate to techniques of processing data for display on the GPS device, or in any GIS environment. As an example, raster format basically stores a set of images that are "pinned" to a geographic location on the earth. When the GPS location data is input into the GPS software, the image is called up and displayed on the screen. Vector format has discrete points individually coded with geographic location information. That information is output to a program which literally draws the geographic image and then places it on a screen.

As used herein, the above definitions are merely examples. There can be other variations, modifications, and alternatives and meanings consistent with those interpretations known in the art.

Figure 2:
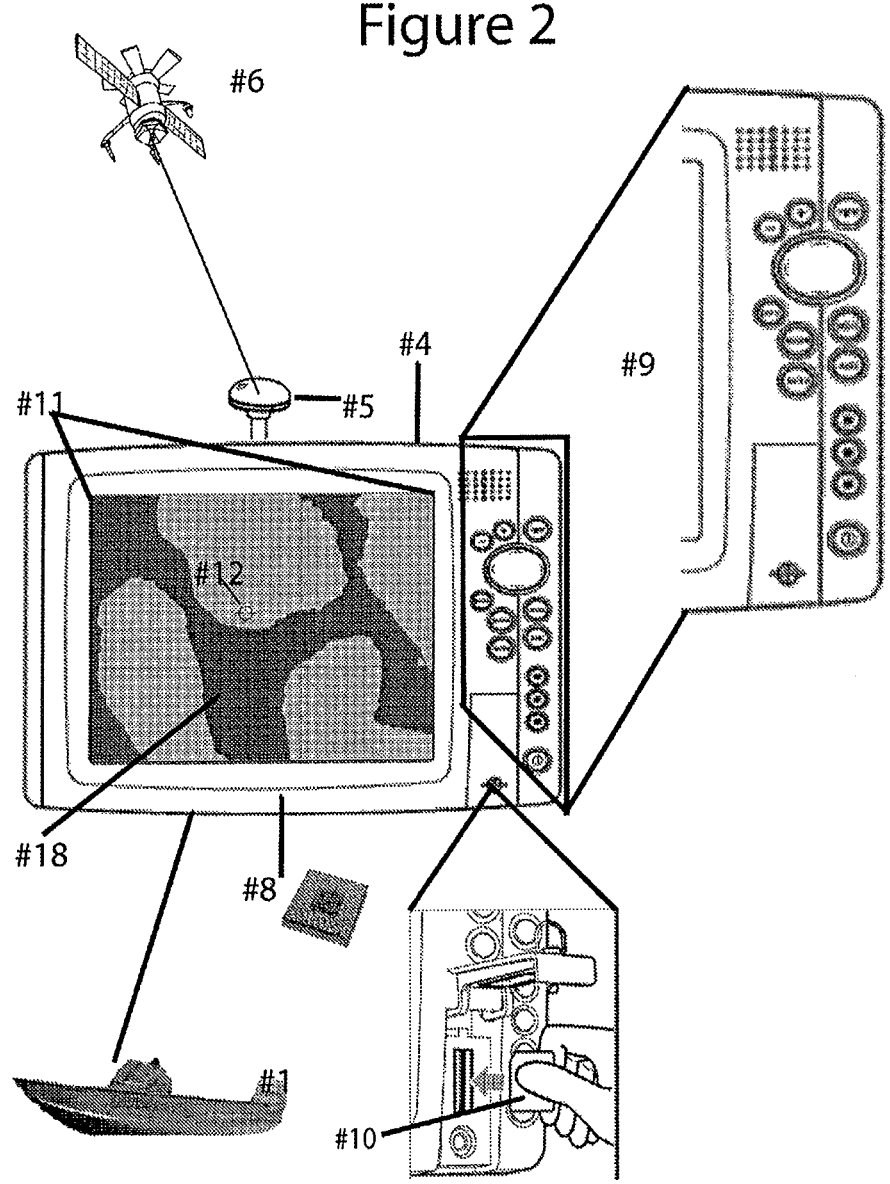
FIG. 2 is a simplified diagram of the GPS Display Device apparatus according to an embodiment of the present invention.
Figure 6:
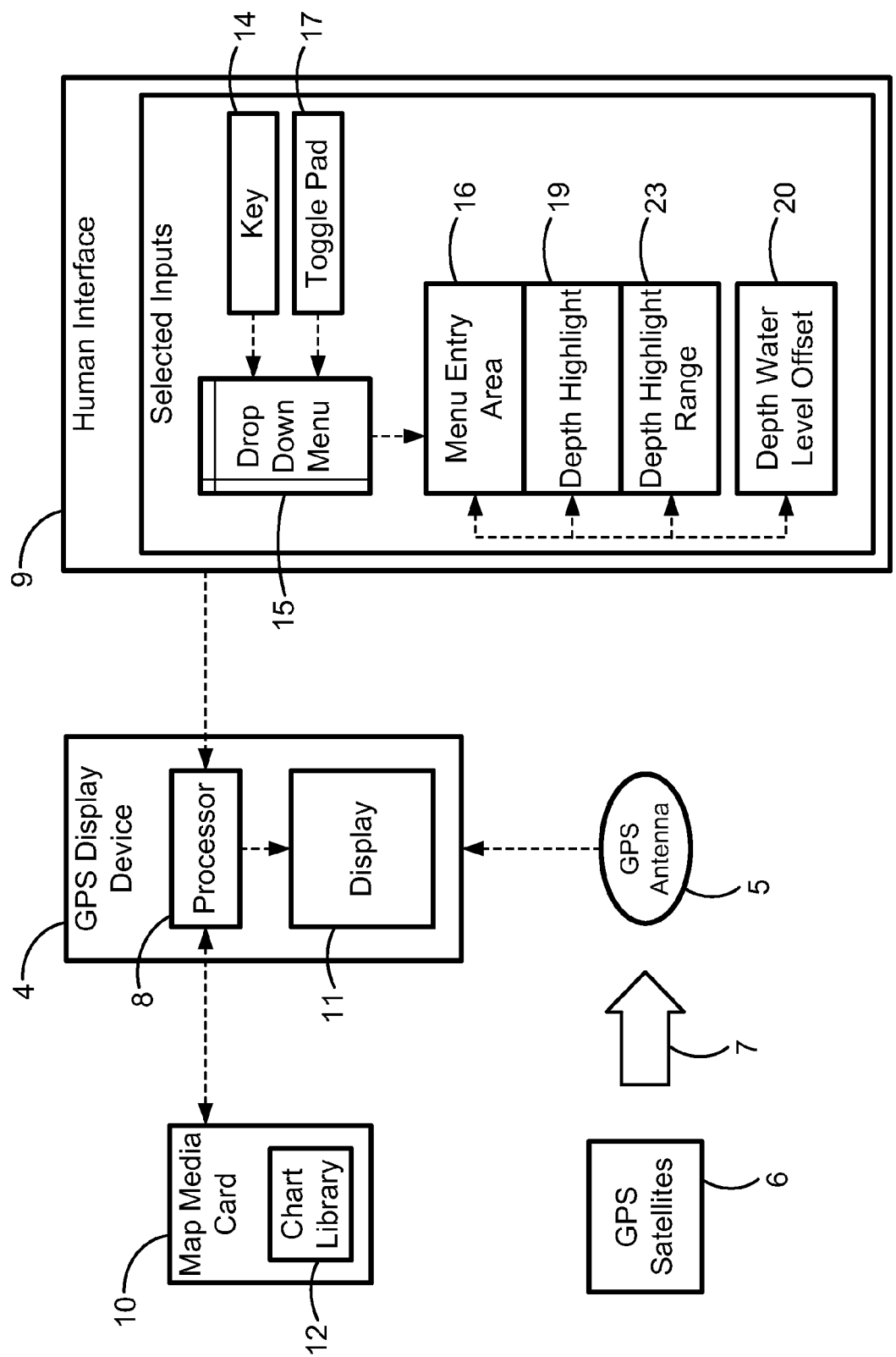
FIG. 6 is a simplified block diagram according to the current embodiment of the present invention.

Referring to FIGS. 1, 2, and 6, a vessel, shown as a watercraft 1, on a surface 2 of a body of water 3, employs a GPS device 4 mounted on the watercraft connected to a GPS antenna 5. In a specific embodiment, the watercraft could be any suitable vessel or the like, which can be provided on the surface of the body of water. The water can be from a river, lake, ocean, pond, or the like. In a specific embodiment, the GPS Display Device can be a GPS chart plotter or separate Liquid Crystal Display Monitor. Of course, there can be other variations, modifications, and alternatives.

In a specific embodiment, the combo unit includes a SONAR unit or commonly termed a "fish finder," which is further described below by one of ordinary skill in the art.

A fishfinders is a type of fathometer, both being specialized types of echo sounding systems, a type of Active SONAR. ('Sounding' is the measurement of water depth, a historical nautical term of very long usage.) The fishfinder uses active sonar to detect fish and 'the bottom' and displays them on a graphical display device, generally a LCD or CRT screen. http://en.wikipedia.org/wiki/Fishfinder.

In a specific embodiment, the fish finder operates in the following manner, as described by one of ordinary skill in the art.

In a generalized sense, an electrical impulse from a transmitter is converted into a sound wave by the transducer, called a hydrophone, and sent into the water. When the wave strikes something such as a fish, it is reflected back and displays size, composition, and shape of the object. The exact extent of what can be discerned depends on the frequency and power of the pulse transmitted. The signal is quickly amplified and sent to the display. Knowing that the speed of the wave in the water is 4921 ft/s (1500 m/s) in seawater, 4800 ft/s (1463 m/s) in freshwater (typical values used by commercial fish finders), the distance to the object that reflected the wave can be determined. The process can be repeated up to 40 times per second and eventually results in the bottom of the ocean being displayed versus time (the fathometer function that eventually spawned the sporting use of fishfinding) Note: This discussion of the propagation of sound in water is simplified, speed of sound in water depends on the temperature, salinity and ambient pressure (depth). This follows approximately this formula:

$$c=1448.6-4.618T-0.0523T2+1.25*(5-35)+0.017D$$

where
c=sound speed (m/s)
T=temperature (degrees Celsius)
S=salinity (pro mille)
D=depth
This will give variations in speed through the water column."

http://en.wikipedia.org/wiki/Fishfinder. Of course, there can be other variations, modifications, and alternatives.

GPS satellites 6 in geosynchronous orbits continuously transmit signals 7 that are received by the antenna 5 and transmitted to the GPS device 4 according to a specific embodiment. The GPS device 4 system includes the antenna 5 connected to a GPS device 4 that has a processor 8, a Human Interface 9, in the present embodiment, one or more preprogrammed Map Media Cards 10 containing digital records in the form of a Chart Library 12 and a visual display area 11. In a specific embodiment, the Map Media Cards include secure digital, micro digital, DVD, and other suitable formats. In a specific embodiment, the Human Interface can include input keys, track balls, or other mechanical input devices. In other embodiments, the Interface can also be a touch screen or any voice activated input device, or other combinations. Of course, there can be other variations, modifications, or alternatives.

The processor 8 repetitively processes the signals from the satellites 6 to determine the position of the watercraft 1. Alternatively the processor 8 may receive position information input from the Human User Interface. The processor 8, using this position information determines the correct visual map image to retrieve from the Chart Library 12 on the Map Media Card 10 to display in the visual display area 11. That is, the processor associates the position information, which constitutes unique true geographical world location coordinates, and relates such information to a certain visual map image in digital form from a plurality of map images in at least one embodiment. As an example, the processor is a Graphics controller or preprogrammed micro processor, but can be others. In a specific embodiment, the term processor is used broadly to include hardware, firmware, and software embodiments, among combinations, and the like. The processor then retrieves any user pre-sets inputted through the Human Interface 9 to modify the map image retrieved from the Map Media Card 10 to create a modified map image from the original map image. The processor 8 then places the modified map image 18 in the visual display area 11. As an example, the processor 8, using a specific depth value, e.g. 10 feet input from the Human User Interface 9, modifies the imbedded codes in the visual image previously retrieved from the Chart Library based on the current calculated position of the Watercraft 1. The modified codes cause the processor 8 to then highlight the specified 10 foot depth by coloring the 10 foot contour line green. The Processor 8 then places the modified map showing the specific highlighted contour in the Visual Display Area 1. Of course the visual display area can alternatively display the modified map 18 for any location the user may input to the GPS device. There can be other variations, modifications, or alternatives.

Referring to FIGS. 1, 2, 3, and 6, in an embodiment using information obtained from external sources, the user selects a depth for input to the device, namely the depth the user wants to highlight for operation of their vessel or at which to fish or investigate. In the present embodiment the user selects a drop down menu 15 by pressing the correct key 14 in combination with the toggle pad 17 in the Human Interface 9. The user then selects a menu entry area 16 from the drop down menu using a toggle pad 17 and correct key 14. By moving a slid bar 22 (or other means) in the menu entry area using a toggle pad 17, the user selects the desired depth 19. The processor 8 repetitively processes the signals 7 from the satellites 6 or refers to position information enter by the user through the Human User Interface to determine the position of the chart to be placed on the GPS Display Device.

Figure 3:
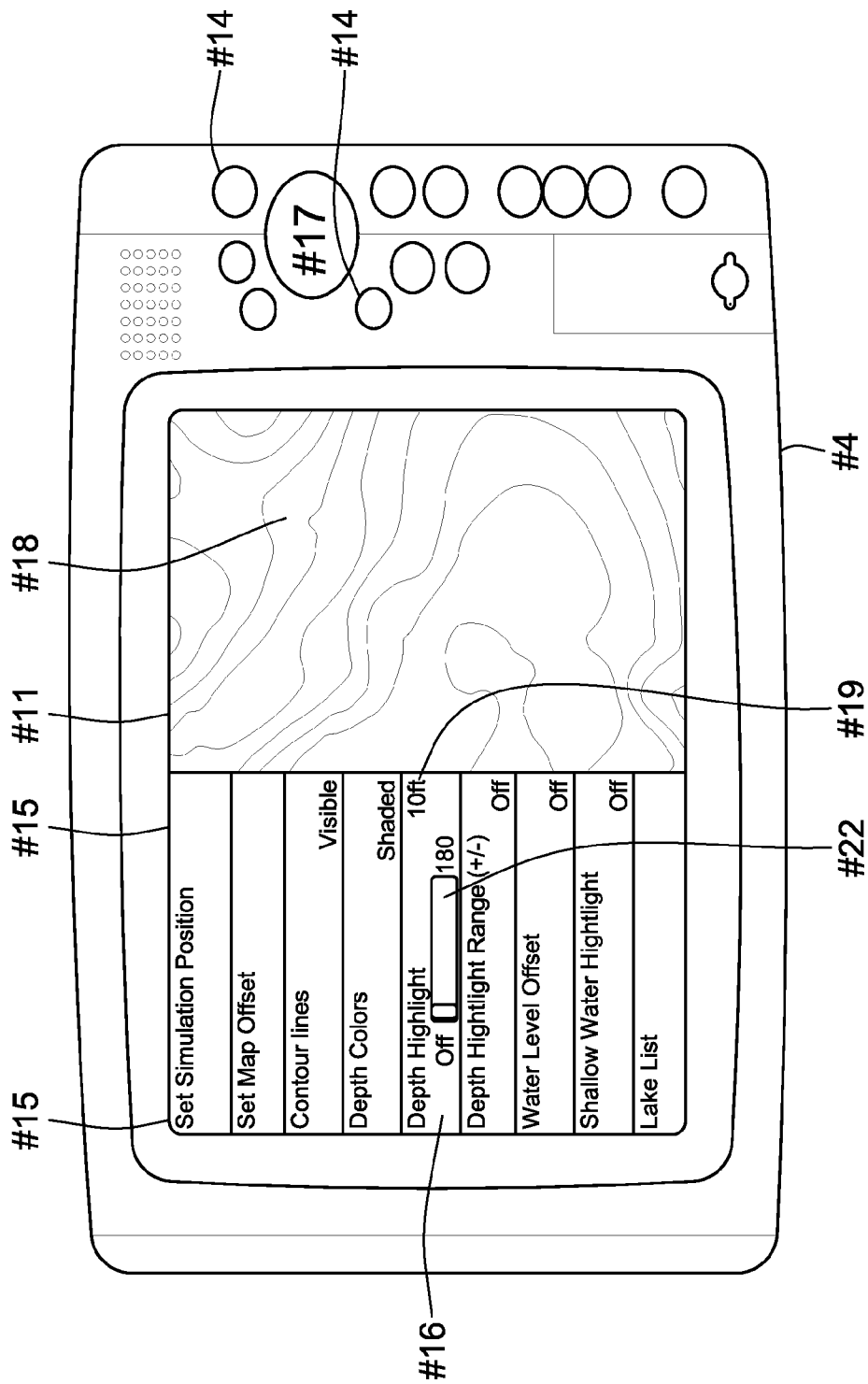
FIG. 3 is a simplified diagram illustrating the depth highlight feature according to embodiments of the present invention.
Figure 4:
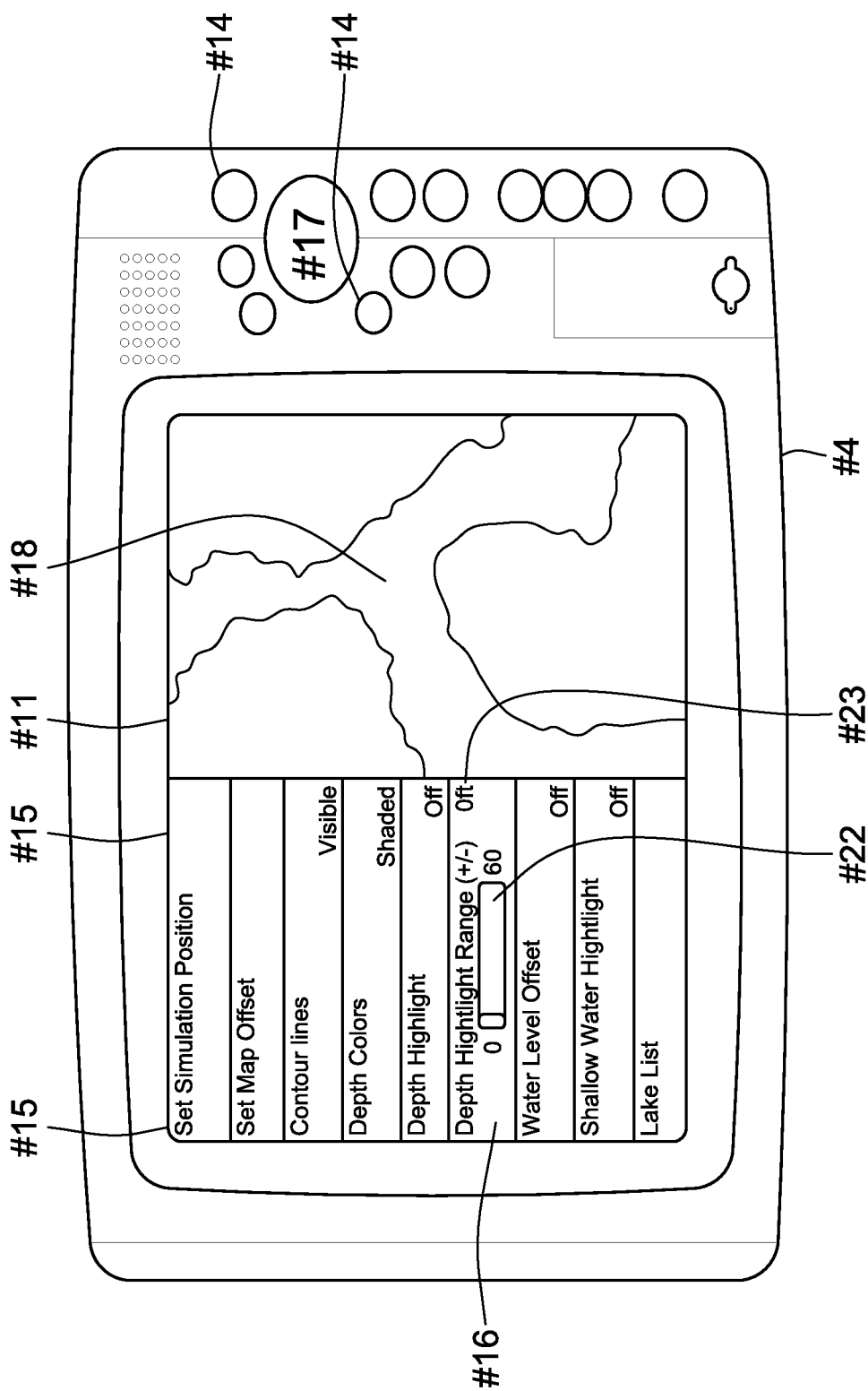
FIG. 4 is a simplified diagram illustrating the depth highlight range feature according to embodiments of the present invention.
Figure 5:
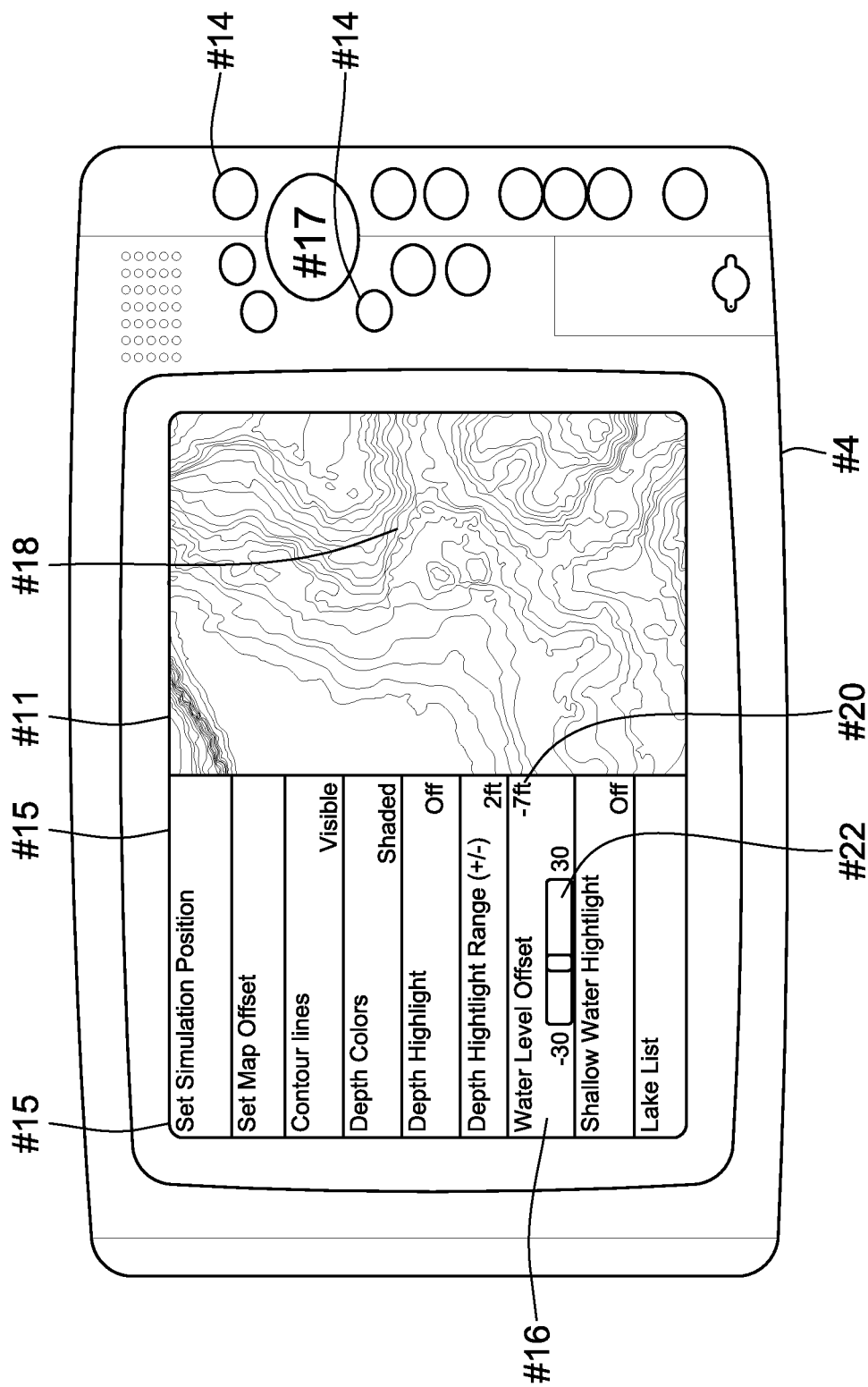
FIG. 5 is a simplified diagram illustrating the water level offset feature according to embodiments of the present invention.

As shown, the display includes a chart or map portion and menu portion according to a specific embodiment, as referenced in FIGS. 3, 4, and 5, for example. The display also includes hardware and/or user touch interface devices, such as keys, switches, and the like. The map portion includes the output of the body or water or portion of the body of water and surrounding land regions in a specific embodiment. The menu portion includes functions or indications for Set Simulation Position, Set Map Off Set, Contour Lines, Depth Highlight, Depth Highlight Range, Water Level Off-set, Shallow Water Highlight, and Lake List, among other functions, and/or others. Of course, there can be other variations, modifications, and alternatives.

The processor 8, using this position information, determines the correct visual map image to retrieve from the Chart Library 12 on the Map Media Card 10. Based on this user input, the processor 8 modifies the map image retrieved from the Chart Library 12 to include the highlighted depth in the retrieved map image. The processor 8 then places the modified map image 18 in the visual display area 11 according to a specific embodiment. Alternatively, the Human Interface 9 may have switches or push buttons, or any of a variety of mechanical input elements, display menus and depth selection techniques. Of course the visual display area can alternatively display the modified map 18 for any location the user may choose to determine. Of course, there can be other variations, modifications, or alternatives.

Referring to FIGS. 1, 2, 4, and 6, in a further embodiment using information obtained from external sources, the user selects a range of depths for input to the GPS Display Device 4, namely the range of depths the user wants to highlight for operation of their vessel or at which to fish. In the present embodiment the user selects a drop down menu 15 by pressing the correct key 14 in combination with the toggle pad 17 in the Human Interface 9. The user the selects a menu entry area 16 from the drop down menu using a toggle pad 17 and correct key 14. By moving a slid bar 22 in the menu entry area 16 using a toggle pad 17, the user selects the desired range of depths 23. The processor 8 repetitively processes the signals from the satellites 6 to determine the position of the watercraft for refers to position information enter by the user through the Human User Interface. The processor 8, using this position information determines the correct visual map image from the Chart Library 12 to display in the visual display area 11. Based on this user input, the processor 8 modifies the map image retrieved from the Chart Library 12 to include the highlighted range of depths in retrieved map image. The processor 8 then places the modified map image 18 in the visual display area 11. Alternatively, the Human Interface 9 may have switches or push buttons, or any of a variety of mechanical input elements, display menus and depth selection techniques. Of course the visual display area can alternatively display the modified map 18 for any location the user may choose to determine or select.

Referring to FIGS. 1, 2, 5, and 6, in a further embodiment using information obtained from external sources, the user selects a value, namely the amount by which to adjust, plus or minus, the depth values of the water body 3 in the map image 18 to reflect changes in the water level of the water body 3. In the present embodiment, the user selects a drop down menu 15 by pressing the correct key 14 in combination with the toggle pad 17 in the Human Interface 9. The user selects a menu entry area 16 from the drop down menu using a toggle pad 17 and correct key 14. By moving a slid bar 22 in the menu entry area 16 using a toggle pad 17, the user selects the desired value 20, plus or minus, by which to adjust the depth values of the water body 3. The processor 8 repetitively processes the signals from the satellites 6 to determine the position of the watercraft 1 or refers to position information enter by the user through the Human User Interface. The processor 8, using this position information determines the correct visual map image from the Chart Library 12 to display in the visual display area 11. Based on this user input, the processor 8 modifies the map image retrieved from the Chart Library 12 to include the modified depths in retrieved map image together with an indication of areas previously inundated now above the water surface 2 (minus value adjustment) or, where the chart contains positive elevation value attributes above the zero depth line, previously above the water surface 2 now submerged (positive value adjustment). The processor 8 then places the modified map image 18 in the visual display area 11. Alternatively, the Human Interface 9 may have switches or push buttons, or any of a variety of mechanical input elements, display menus and depth selection techniques. Of course the visual display area can alternatively display the modified map 18 for any location the user may choose to determine or select.

In a preferred embodiment, GPS satellites in geosynchronous orbits continuously transmit signals received by the antenna receives, processes and transmits to the GPS device as latitude/longitude position data according to a specific embodiment. The GPS system includes a GPS device that has a processor, a Human Interface, in the present embodiment, one or more preprogrammed Map Media Cards containing digital records in the form of a Chart Library and a visual display area. In a specific embodiment, the Map Media Cards include secure digital, micro digital, DVD, or others. In a specific embodiment, the Human Interface can include input keys, track balls, or other mechanical input devices. In other embodiments, the Interface can also be a touch screen or any voice activated input device. Of course, there can be other variations, modifications, or alternatives.

In the preferred embodiment, the antenna repetitively processes the signals from the satellites to determine the position of the watercraft and sends the position information to the processor or refers to position information entered by the user through the Human User Interface. The processor, using the position information, determines the correct visual map image to retrieve from the Chart Library on the Map Media Card to display in the visual display area. As an example, the processor is a Graphics controller or preprogrammed micro processor, but can be others. The processor then retrieves any user pre-sets inputted through the Human Interface to modify the map image retrieved from the Map Media Card to create a modified map image. The processor then places the modified map image in the visual display area. As an example, the processor, using a specific depth value, e.g. 10 feet input from the Human User Interface modifies the imbedded codes in the visual image previously retrieved from the Chart Library based on the current calculated position of the Watercraft. The modified codes cause the processor to then highlight the specified foot depth by coloring the foot contour line green. The Processor then places the modified map showing the specific highlighted contour in the Visual Display Area. Of course the visual display area can alternatively display the modified map for any location the user may choose to determine. There can be other variations, modifications, or alternatives.

In a preferred embodiment, using information obtained from external sources, the user selects a depth for input to the device, namely the depth the user wants to highlight for operation of their vessel or at which to fish. In the present embodiment the user selects a drop down menu by pressing the correct key in combination with the toggle pad in the Human Interface. The user then selects a menu entry area from the drop down menu using a toggle pad and correct key. By moving a slid bar (or other means) in the menu entry area using a toggle pad, the user selects the desired depth. The antenna repetitively processes the signals from the satellites 6 to determine the position of the watercraft 1 or refers to position information enter by the user through the Human User Interface.

The processor, using this position information determines the correct visual map image to retrieve from the Chart Library on the Map Media Card. Based on this user input, the processor modifies the map image retrieved from the Chart Library to include the highlighted depth in the retrieved map image. The processor then places the modified map image in the visual display area according to a specific embodiment. Alternatively, the Human Interface may have switches or push buttons, or any of a variety of mechanical input elements, display menus and depth selection techniques. Of course the visual display area can alternatively display the modified map for any location the user may choose to determine. Of course, there can be other variations, modifications, or alternatives.

In a preferred embodiment, using information obtained from external sources, the user selects a range of depths for input to the GPS Display Device, namely the range of depths the user wants to highlight for operation of their vessel or at which to fish. In the present embodiment the user selects a drop down menu by pressing the correct key in combination with the toggle pad in the Human Interface. The user the selects a menu entry area from the drop down menu using a toggle pad and correct key. By moving a slid bar in the menu entry area using a toggle pad, the user selects the desired range of depths. The antenna repetitively processes the signals from the satellites to determine the position of the watercraft 1 or refers to position information enter by the user through the Human User Interface. The processor, using this position information determines the correct visual map image from the Chart Library to display in the visual display area. Based on this user input, the processor modifies the map image retrieved from the Chart Library to include the highlighted range of depths in retrieved map image. The processor then places the modified map image in the visual display area. Alternatively, the Human Interface may have switches or push buttons, or any of a variety of mechanical input elements, display menus and depth selection techniques. Of course the visual display area can alternatively display the modified map for any location the user may choose to determine.

In the preferred embodiment, using information obtained from external sources, the user selects a value, namely the amount by which to adjust, plus or minus, the depth values of the water body in the map image to reflect changes in the water level of the water body. In the present embodiment, the user selects a drop down menu by pressing the correct key in combination with the toggle pad in the Human Interface. The user selects a menu entry area from the drop down menu using a toggle pad and correct key. By moving a slid bar in the menu entry area using a toggle pad, the user selects the desired value, plus or minus, by which to adjust the depth values of the water body. The antenna repetitively processes the signals from the satellites to determine the position of the watercraft 1 or refers to position information enter by the user through the Human User Interface. The processor, using this position information determines the correct visual map image from the Chart Library to display in the visual display area. Based on this user input, the processor modifies the map image retrieved from the Chart Library to include the modified depths in retrieved map image together with an indication of areas previously inundated now above the water surface (minus value adjustment) or, where the chart contains positive elevation value attributes above the zero depth line, previously above the water surface now submerged (positive value adjustment). The processor then places the modified map image in the visual display area. Alternatively, the Human Interface may have switches or push buttons, or any of a variety of mechanical input elements, display menus and depth selection techniques. Of course the visual display area can alternatively display the modified map for any location the user may choose to determine. Further details of the present method can be found throughout the present specification and more particularly below.

In one or more embodiments, certain functionality of the present Chart Library API is novel and unique GPS plotter technology as applied to the fishing and boating industry according to one or more embodiments. The functionality is provided to the API and is thus applicable to any unit that can access the API. The following mapping display functions are described below:

1. Depth Highlight
2. Depth Highlight Range
3. Water Level Offset

Each of the above functions and graphic primitives that allow those functions to be displayed on a GPS Display Device is resident in one or more codes provided in computer readable memory. The GPS manufacturer provides the Operating System Menu Options that allow these functions to be turned on or off and be incrementally adjusted using a slide tool bar. Of course, there can be other variations, modifications, and alternatives. Other examples of mapping functions can be found in co-pending patent application filed on the same date of the present application listed as U.S. patent application Ser. No. 12/833,907, entitled, "SHALLOW WATER HIGHLIGHT METHOD AND DISPLAY SYSTEMS," commonly assigned, and hereby incorporated by reference in its entirety.

The following screen captures showing the display functionality taken from a GPS/Sonar unit are further described throughout the present specification and more particularly in the accompanying text.

The Depth Highlight (DH) function can be a stand-alone function or can be enhanced with the Depth Highlight Range (DHR) function, as described below in the bolded headings.

Depth Highlight

When Depth Highlight is used as a stand-alone function a specific depth contour interval or line can be selected and highlighted in a different color. A contour interval is defined as a specific depth contour line and the spatial interval between that depth and the next deeper contour line in descending depth. Isolating and highlighting this line or interval allows the angler the opportunity to narrow his or her focus on a specific water column that they intend to fish.

Figure 10:
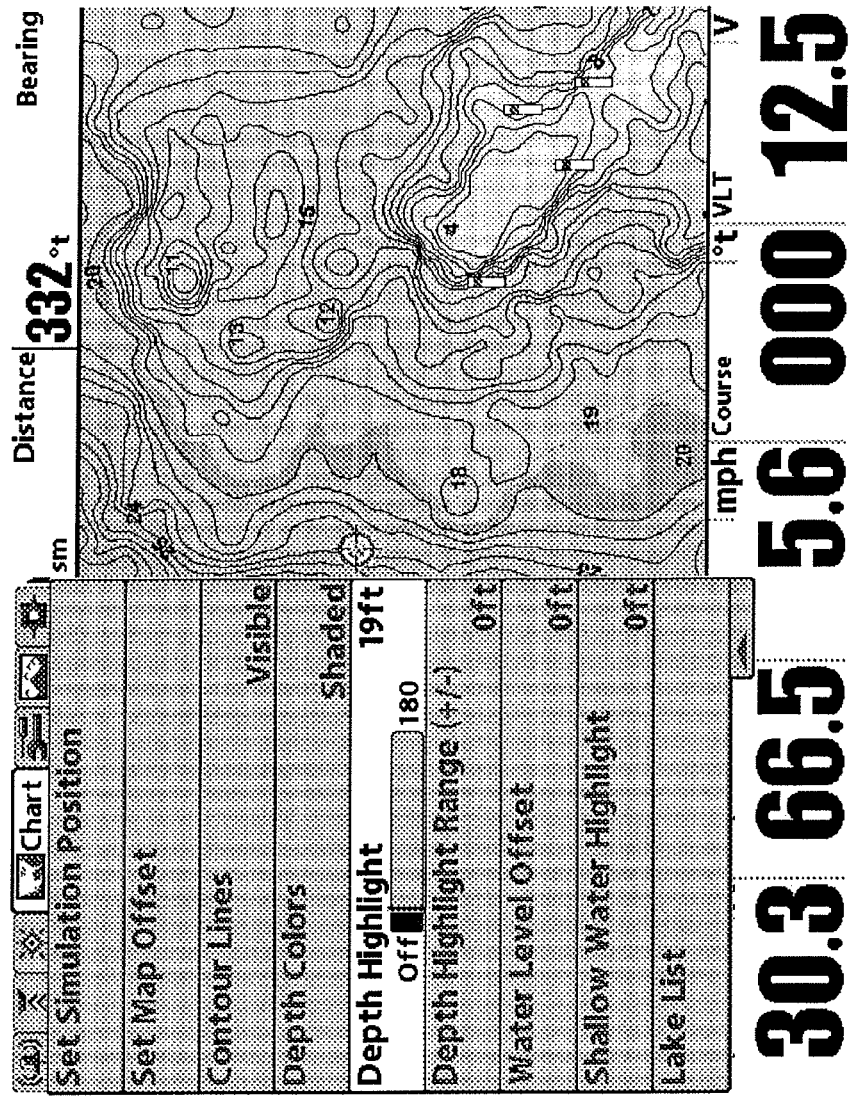

For example, if the 19-foot depth is selected and highlighted then the area or interval between 19 and 20 feet will be shaded or changed to a different color from the surrounding contours. See, for example, FIG. 10.

Figure 11:
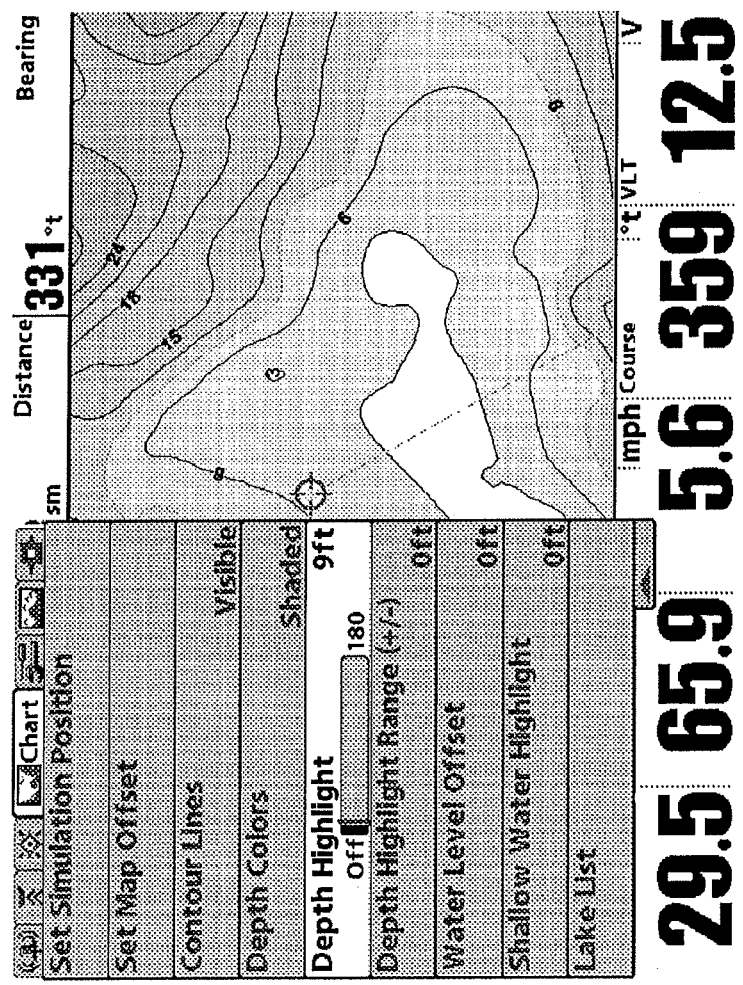

The DH tool selection and the resulting shaded or colored chart may vary with different types of Charts viewed. If the DH function is activated on a High-Definition map of 1-foot depth intervals then the result will be as described above. If the chart is a Hi-Def chart of 3-foot intervals and depths divisible by 3 are selected then just the contour line will be shaded or highlighted. See, for example, FIG. 11.

Figure 12:
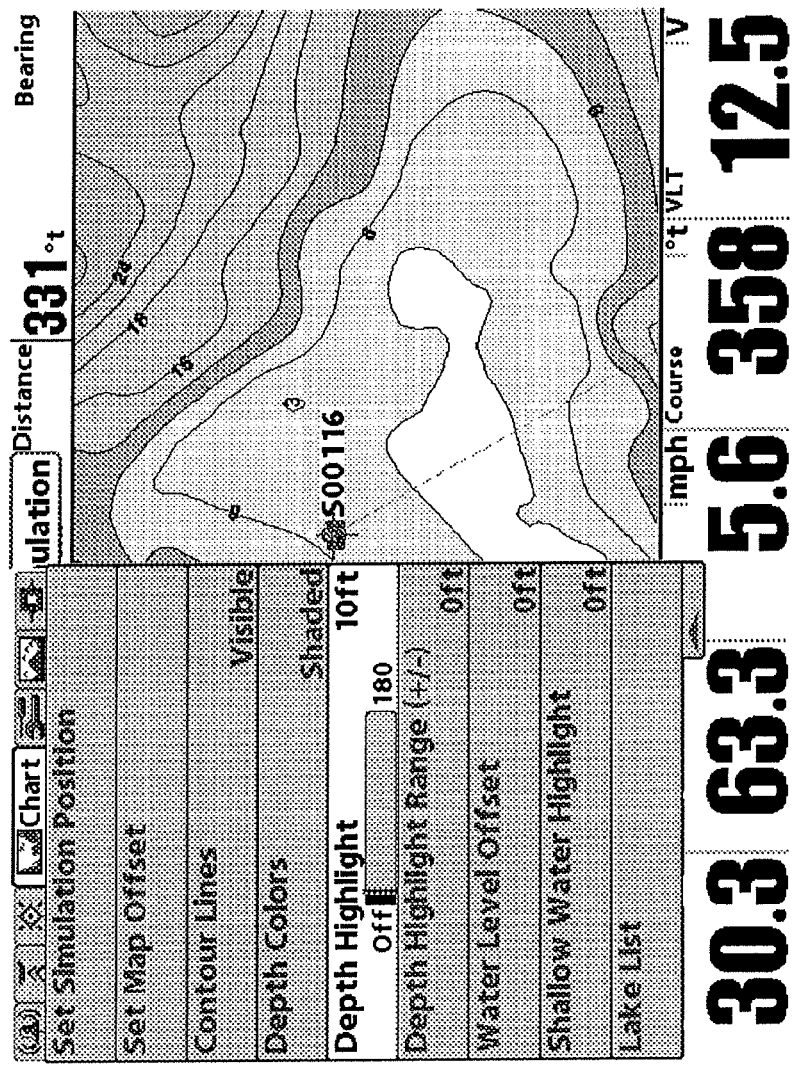
Figure 13:
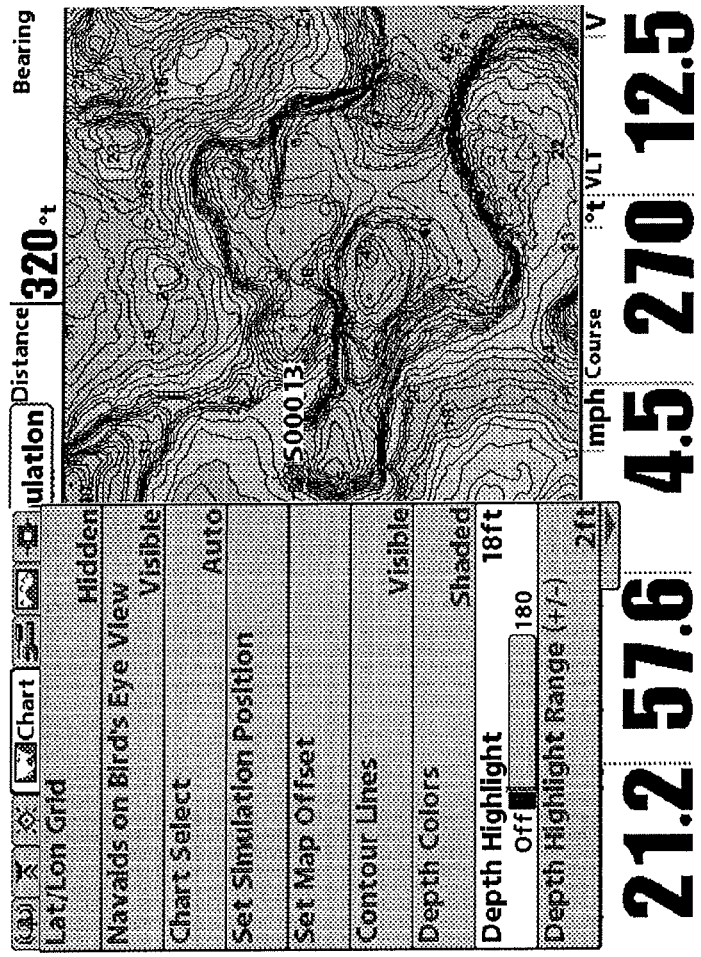
Figure 14:
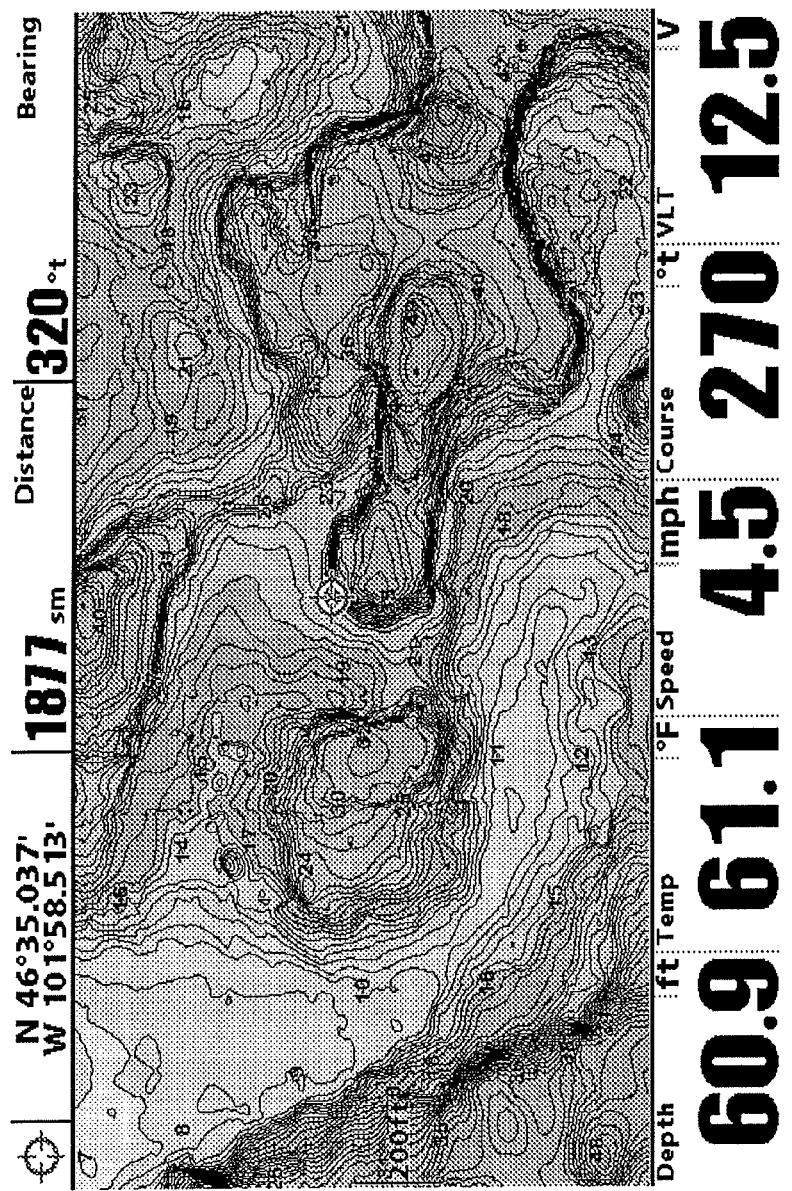
Figure 15:
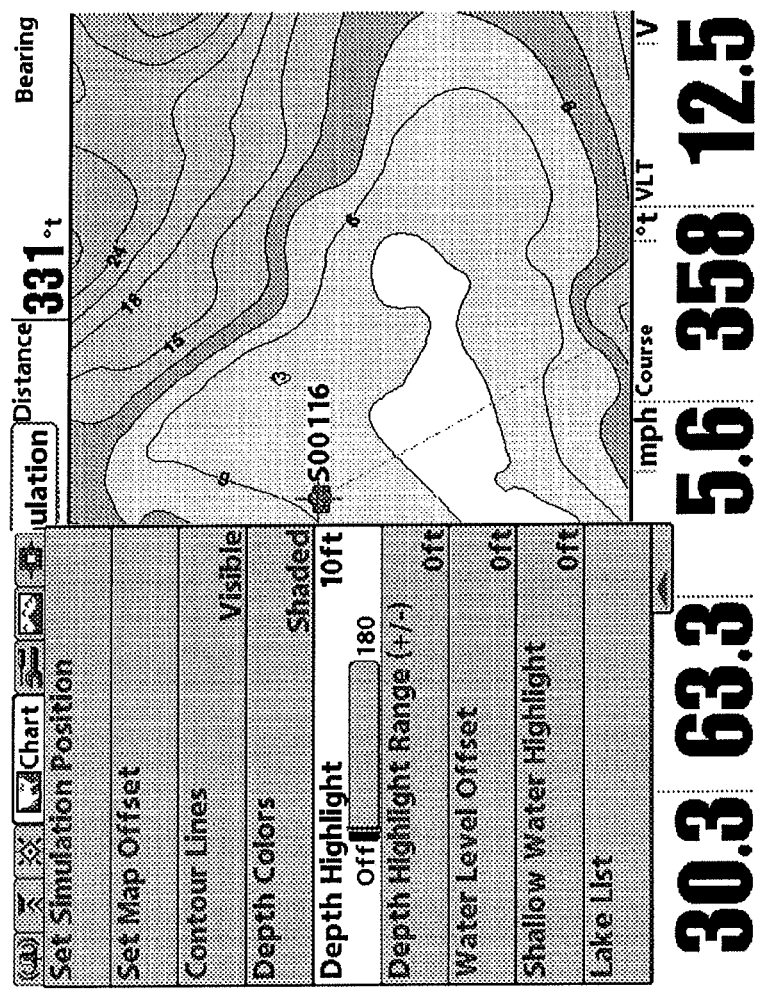

If any other depth is selected with the 3-foot Hi-Def chart the entire depth interval will be highlighted in which that depth falls. For example if the 10-foot DH is selected then the 9-12 foot depth interval will be highlighted. See, for example, FIG. 12.

Similarly, if the DH is applied to a Standard Depth Chart (Chart with 5-foot depth contour intervals) then the chart will be shaded or rendered as it is when with a 3-foot chart but in intervals of five feet.

Depth Highlight Range

The Depth Highlight Range is only active when the DH is switched on and set to a specific depth. The DHR function allows the selected DH depth to be expanded to include a larger range of depths. Once the DHR is set, changing the DH setting allows the angler to highlight a different depth with the same spread or range without having to reset the DHR.

When viewing a Hi-Def 1-foot chart with the DH set at 18-feet and the DHR set at 2-feet, then the chart area between 16-feet and 20-feet will be highlighted.

By adjusting the DHR setting at a fixed DH, the angler can increase or decrease the depth area that is rendered on the chart.

Types of charts available to apply these tools to may vary from region to region. There are basically to types of charts, Standard Definition (SD) and High Definition (HD). Standard Definition charts are most often displayed in 5-foot depth intervals with contour depth lines for every 5-foot of depth. High Definition charts are available in 1-foot depth intervals (most common and described earlier) or a chart with 3-foot depth intervals. Viewing a 3-foot Hi-Def or a 5-foot Standard Depth chart and applying the DH or DHR tools will have varying results. Selecting a Depth Highlight or a Depth Highlight Range not common to the chart will result in a rendered chart with values rounded up or down to the nearest contour line or interval of that chart.

For example, when viewing a 3-foot chart and selecting a 10-foot DH, the entire interval between 9 and 12 will be highlighted. Expanding the DHR by 1-foot will have no apparent change in the rendered chart because the chart interval is every 3-feet and the DH and DHR selections are all within the 3-foot chart intervals.

By setting the DH and the DHR to values that are equivalent to the common depth increments of the chart, the highlighted or rendered result will better reflect the setting chosen by the angler.

In a specific embodiment, the present invention provides a method to graphically output a depiction of one or more selected areas of a body of water together with adjacent contiguous land surface areas above the water surrounding said water body to a Global Positioning System (GPS) Display Device. The display is coupled to a GPS plotter in a specific embodiment. The method includes providing at least one chart of one or more regions of a body of water. The chart comprises a plurality of bottom depths below a surface of the one or more regions of the body of water. The chart is configured to be output on the display. The method also includes selecting at least one depth to be highlighted on the display simultaneously with the chart and processing information associated with the selected depth with information from the chart to identify one or more regions comprising a structure within a vicinity of the selected depth in a specific embodiment and/or a contour within the vicinity of the selected depth. The method includes outputting one or more indications associated with the one or more regions on the display to highlight the one or more regions of contiguous depth ranges comprising the structure within the vicinity of the selected depth and/or highlighting the contour for easy visualization by the user. These elements may be included in one or more embodiments.

In a specific embodiment, the present invention provides other variations, modifications, and alternatives. In a specific embodiment, the present invention provides a chart coupled to output device or display. The chart comprises information associated with the plurality of bottom depths. In other embodiments, the present method and system can identify structure, including a bottom region of the body of water, a change in elevation of a bottom region of the body of water, a change in composition of a bottom region of the body of water, other combinations, and the like. In a specific embodiment, the method also includes outputting of the one or more indications simultaneously with the remaining chart data. Of course, there can be other variations, modifications, and alternatives.

In other specific embodiments, the method includes other interface features. That is, the method includes selecting of the depth comprises inputting the depth through a user interface provided on the display. Alternatively, the method also includes selecting of the depth comprises moving a slide bar on a user interface provided on the display. The method may also include selecting of the depth comprises using a key pad or toggle on the GPS device. In a specific embodiment, the method can also include selecting of the depth comprises inputting the depth through a user interface to allow one or more voice commands. In other embodiments, the present invention provides selecting of the depth comprises inputting the depth through a user interface provided through a key pad or toggle separate from the GPS device. Of course, there can be other variations, modifications, and alternatives.

The present method and system can include other variations. The body of water is selected from a lake, an ocean, a bay, a river, a reservoir, an impoundment, a pond, and a stream. In a specific embodiment, the region of interest is the structure within the vicinity of the contiguous range of selected depths is within a region below the selected depth. The vicinity of contiguous ranges of the selected depth is within a region above the selected depth or the vicinity of contiguous ranges of the selected depth is within a determined range of depths contiguous with the selected depth in a specific embodiment. In a specific embodiment, the present method and system includes a chart further comprising one or more spot depths, at least one continuous depth contour line at a selected depth for the one or more regions of the body of water, combinations, and the like. The selected depth can also be a thermocline region. In other embodiments, the surface of the one or more regions comprises one or more regions of sheets of ice. In a specific embodiment, the chart comprises hardness of the bottom of the water body, the chart comprises content of the bottom of the water body, the chart comprises a weed content of the water body, the chart comprises currents present in the water body or the chart comprises any combination of the above elements together with a plurality of bottom depths below a surface of the regions of the body of water together with land surface adjacent to the body of water. Again, there can be other variations, modifications, and alternatives.

In a specific embodiment, the present invention provides for a display having one or more indications alone or in combination with any of the elements described herein, as well as outside of the present specification. In specific embodiment, the one or more indications are associated with one or more shaded regions, one or more flashing regions, one or more broken contour lines, one or more flashing contour lines, one or more solid lines, one or more broken lines, one or more series of symbols, and other combinations, and the like. In a specific embodiment, the one or more indications are associated with one or more contour lines differentiated from the remaining contour lines, one or more shaded regions differentiated from the remaining regions, one or more colored regions differentiated from the remaining regions, other combinations, and the like. In other embodiments, the one or more indications are associated with alarms signaling a departure from the selected depth or are associated with alarms signaling a departure from the selected depth region, combinations, and the like. In other embodiments, the one or more indications are associated with one or more separate routes independent from the selected lines, are associated with one or more separate regions independent from the selected regions, are associated with one or more colored regions, are associated with one or more colored contour line labels, are associated with one or more shaded contour line labels, are associated with one or more flashing contour line labels, are associated with one or more differentiated contour line labels. In other embodiments, one of ordinary skill in the art would recognize other variations, modifications, and alternatives.

In a specific embodiment, the present invention includes a system and method implemented using computer hardware and/or software, such as computer code provided on a machine readable medium, such as a hard drive, integrated circuit memory or memories (e.g., random access memory, flash, read only memory). Such memories are coupled to a processor, microprocessor, digital signal processor, or the like via a common or other interface bus according to a specific embodiment. The invention provides a system for displaying a graphical output of one or more selected areas of a body of water. In a specific embodiment, the system comprises one or more computer readable memories. The memories include computer codes to carry out the functionality described herein, as well as outside of the present specification. Of course, there can be other variations, modifications, and alternatives.

In a specific embodiment, the system includes one or more codes directed to at least one chart of one or more regions of a body of water. The chart comprises a plurality of bottom depths below a surface of the one or more regions of the body of water and is configured to be output on the display. The system also has one or more codes directed to receiving information associated with at least one depth to be highlighted on the display simultaneously with the chart and one or more codes directed to processing information associated with the selected depth with information from the chart to identify one or more regions comprising a structure within a vicinity of the selected depth and/or a contour at the selected depth. The system also has one or more codes directed to outputting one or more indications associated with the one or more regions on the display to highlight the one or more regions comprising the structure within the vicinity of the selected depth or output highlighted contour at the selected depth. Again, there can be other variations, modifications, and alternatives.

Still further, the present invention also includes a system for displaying a graphical output of one or more selected areas of a body of water. The system has a display, one or more graphical representations of one or more regions of a body of water, and one or more labeled contour lines representative of an interface between land and the one or more regions of the body of water. The system has a plurality of labeled contour lines representative of respective plurality of bottom depths below the surface of the one or more regions of the body of water and a highlighted region between a first depth and a second depth within the plurality of depths. In a specific embodiment, the highlighted region is representative of an active fish zone based upon a selected depth. In a preferred embodiment, the active fish zone comprises a thermocline, is within a vicinity of one or more structures within the one or more regions of the body of water, or other combinations, and the like. The highlighted region comprises the selected depth from the plurality of depths. In a specific embodiment, the active fish zone is a spatial region above the selected depth, the active fish zone is a spatial region below the selected depth, combinations, and the like. Again, there can be other variations, modifications, and alternatives.

Water Level Offset (WLO)

In a specific embodiment, the present method and system allow the entire range of depth contour lines, on the Chart, to be adjusted to accommodate a change in the Ordinary Water Levels (OWL). When this function is used all the depth labels on each contour line are adjusted to the new depth value throughout the active map. All depth associated values are also dynamically changed (i.e., change within a predetermined time, e.g., a few seconds or less) throughout the chart free from any interaction by the user once the offset has been determined. In a specific embodiment, the term "dynamically" refers to one or more processes occurring within a predetermined time, which is desirable for the user. Such time may be a few seconds or less or practically instantaneously while limited to processing speeds and the like according to certain embodiments. After an adjustment to lower the lake level is used, the lake area that is above the new shoreline (zero depth contour line) is then displayed as land.

Figure 7:
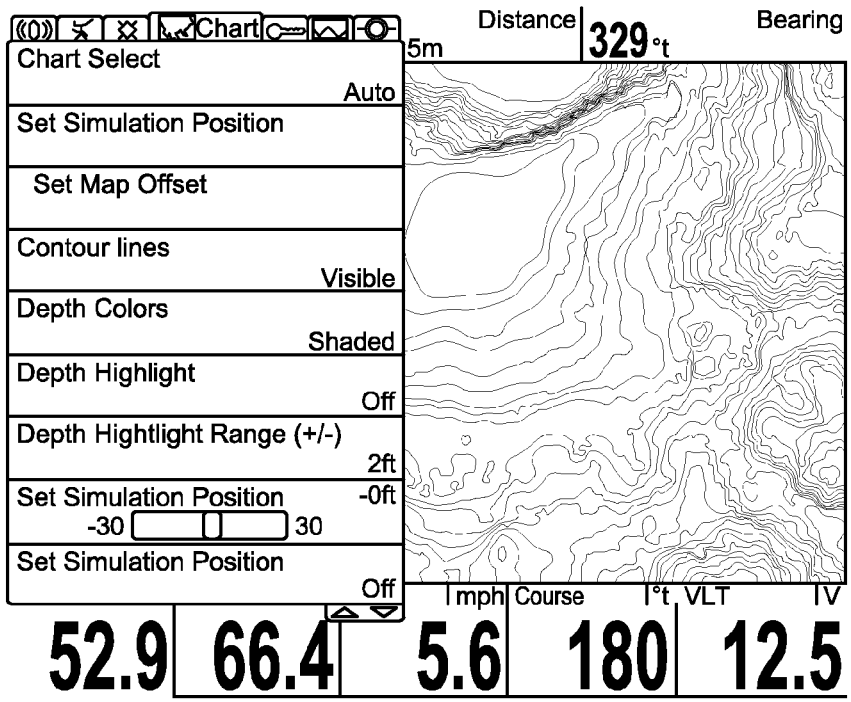
FIGS. 7 thru 15 are simplified GPS map images as they appear in the visual display area of a GPS Display Device in one or more embodiments of the present invention.
Figure 8:
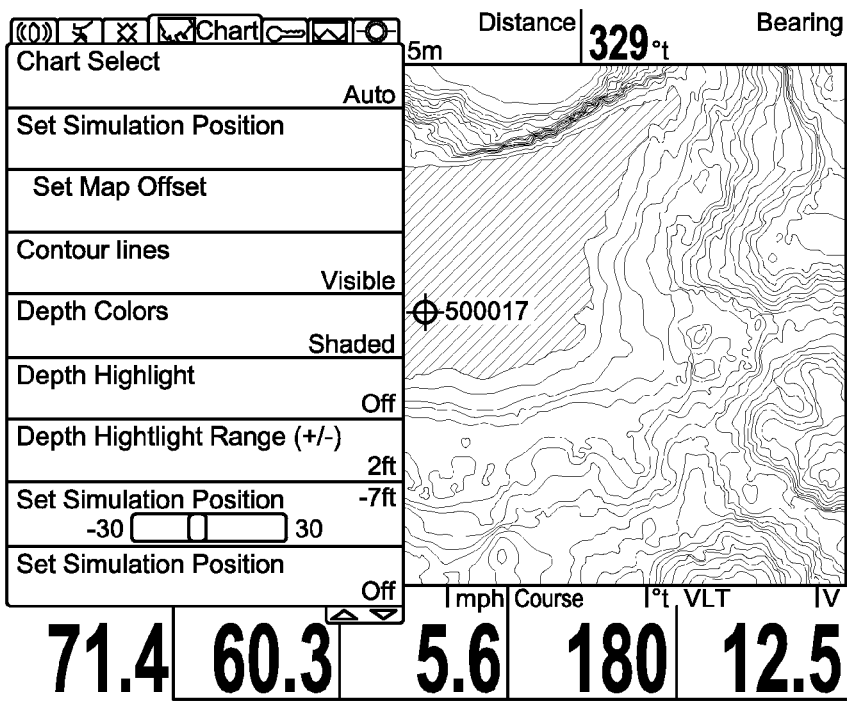
Figure 9:
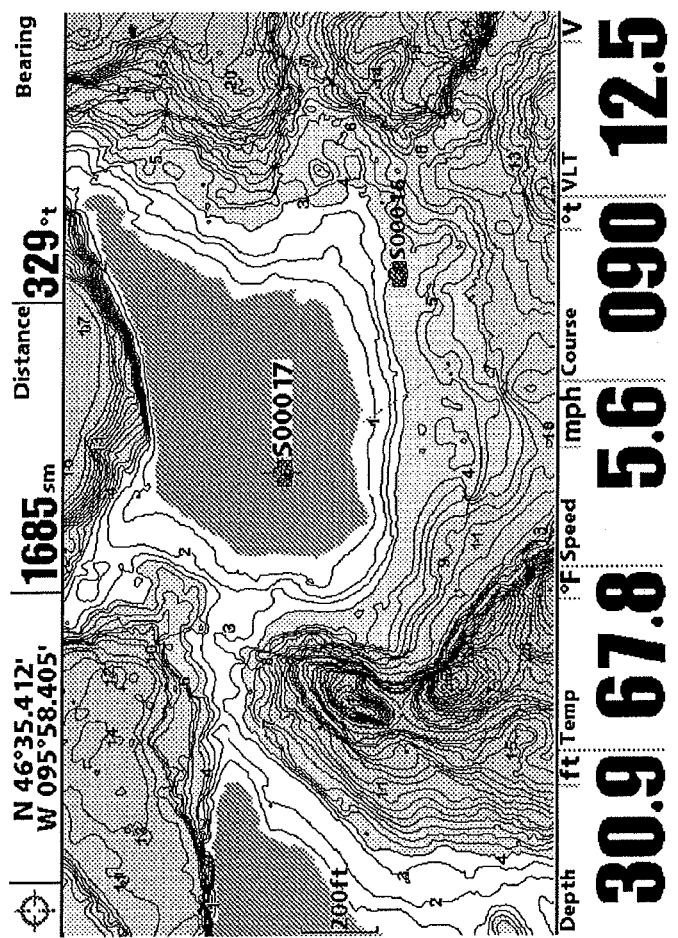

For example, if the water level in a lake has dropped by 7-feet then adjusting the WLO tool bar to minus 7-feet will result in a re-label of the depth contours to reflect this change. The chart area that then lays above the new zero depth is shaded or colored as a dry land area. See, for example, FIGS. 7 and 8. FIG. 9 is an example of WLO adjusted to a negative 7-feet offset. Of course, there can be other variations, modifications, and alternatives.

Conversely, in the event the water level rises above the OWL and the chart has positive elevation value attributes above the zero depth line, then the chart can be adjusted to raise or increase the depth level of the chart.

For example, if the water level has risen 5 feet, adjusting the tool bar to +5 will result in land areas being shown as water areas and the depth labels are adjusted upwards to reflect this change, when the chart has positive elevation value attributes above the zero depth line.

All settings such as DH, DHR and other depth related images are revised to reflect this depth value change.

In a specific embodiment, the present invention provides a method to graphically output a depiction of one or more selected areas of a body of water together with adjacent contiguous land surface areas above the water surrounding said water body to a GPS Display Device. The display is coupled to a GPS plotter according to a specific embodiment. The method includes providing at least one chart of one or more regions of a body of water. The chart comprises a plurality of bottom depths below a surface of the one or more regions of the body of water together with land surface adjacent to the body of water. The chart is configured to be output on the display. In a specific embodiment, the method includes selecting a value, positive or negative off-set, by which to modify the depth labels of the bottom depths (contours) and modify the output on the display of adjacent land surface associated of the one or more regions of the body of water on the display. The method includes processing information associated with the selected value with information from the chart to modify the depth labels associated the bottom depths, e.g., contours, and to modify the depiction of previously exposed adjacent land surface as submerged for positive inputted values, when the chart has positive elevation value attributes above the zero depth line, or previously submerged lake bottom as exposed land surface for negative inputted values. The method outputs one or more indications associated with the one or more regions on the display to display modified depth labels and highlight the one or more regions of now exposed land surface or depict one or more regions of previously exposed land surface as submerged lake bottom.

In a specific embodiment, the method and system includes other variations. In a specific embodiment, the method further comprises outputting a resulting chart representative of the modified display of the land surface adjacent to the body of water on the display and the modified depth label of the bottom depths. In an alternative specific embodiment, the selecting of the positive off-set or a negative off-set comprises a user input consisting of at least inputting the positive or negative off-set value through a user interface provided on the display, moving a slide bar on a user interface provided on the display, using a key pad or toggle on the GPS device, inputting the depth through a user interface to allow one or more voice commands, or inputting the depth through a user interface provided through a key pad or toggle separate from the GPS device. In one or more embodiments, the method includes adjusting all the depth labels on each contour line of a resulting chart based upon the positive or negative off-set value. The invention also includes outputting a resulting chart incorporating the modified depth label within a determined time of less than a few seconds of selecting the value. In one or more embodiments, the off-set value is negative causes an output of a resulting shoreline characterized by a second zero depth contour line that is below a first zero depth contour line of the chart to be modified and an output of each of the other depth labels other than the second zero depth contour lines that scales to the second zero depth contour line and/or the off-set value is positive causes an output of a resulting shoreline characterized by a second zero depth contour line that is above a first zero depth contour line of the chart to be modified and an output of each of the other depth labels other than the second zero depth contour lines that scales to the second zero depth contour line.

In a specific embodiment, there can be various modifications, alternatives, and variations to the present method. The method may include any of the combination of elements described herein. Additionally, the one or more indications are associated with the modification of highlighted areas of a plurality of bottom depths below the surface of the water body. The one or more indications are associated with the modification of highlighted bottom depths of a plurality of bottom depths below the surface of the water body. The one or more indications are associated with the addition of bottom depths to the plurality of bottom depths below the surface of the water body. The one or more indications are associated with the removal of bottom depths from the plurality of bottom depths now depicted as above the surface of the water body. Each of the above may be alternatives, variations, and modifications according to a specific embodiment.

In a specific embodiment, the system can include common hardware and/or software elements. As an example, the system includes a monitor or display, and an associated computing system, which is included and/or coupled to the GPS system and/or depth locator system, e.g., SONOR or fish finder system. The computing system preferably includes familiar components such as a processor or processors as noted, and memory storage devices, such as a random access memory (RAM), a fixed disk drive or flash memory, and a system bus interconnecting the above components. The RAM and fixed disk drive or flash drive are mere examples of tangible media for storage of computer programs, audio and/or video data, and code implementing embodiments of the present invention. Other types of tangible media include SRAM, floppy disks, optical storage media such as CD-ROMs and bar codes, semiconductor memories such as flash memories, read-only-memories (ROMs), ASICs, battery-backed volatile memories, and the like, and combinations. Media cards are included in such memories. Such memories are tangible computer readable memory in a preferred embodiment. Of course, there can be other variations, modifications, and alternatives.

In a specific embodiment, the system can also include a network interface to a computer network, which may be a short range network, wide area network or local area network or combination. Of course, there can be other variations, modifications, and alternatives. The system above discloses examples of configurations that embody the present invention. It will be readily apparent to one of ordinary skill in the art that many system types, configurations, and combinations of the above devices are suitable for use in light of the present disclosure. Of course, the types of system elements used depend highly upon the application.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method of displaying a depiction of an area of a body of water to a display, the method comprising, the steps of:
   receiving a user selection of at least one depth to be highlighted on the depiction of the area of the body of water on the display;
   identifying a contour corresponding to the at least one depth; and
   outputting one or more indications associated with the contour on the display to highlight the contour.

2. The method of claim 1, wherein the step of receiving the user selection of the at least one depth to be highlighted comprises the step of receiving the user selection of a single depth, and wherein the step of identifying the contour comprises the step of identifying a contour line, and wherein the step of outputting one or more indications associated with the contour comprises the step of outputting one or more indications associated with the contour line on the display to highlight the contour line.

3. The method of claim 1, wherein the step of receiving the user selection of the at least one depth to be highlighted comprises the step of receiving the user selection of a depth range, and wherein the step of identifying the contour comprises the step of identifying a contour area, and wherein the step of outputting one or more indications associated with the contour comprises the step of outputting one or more indications associated with the contour area on the display to highlight the contour area.

4. The method of claim 1, wherein the step of identifying the contour comprises the step of identifying a depth contour interval corresponding to the at least one depth, and wherein the step of outputting one or more indications associated with the contour comprises the step of outputting one or more indications associated with the depth contour interval on the display to highlight the contour area.

5. The method of claim 1, wherein the step of receiving the user selection of the at least one depth to be highlighted comprises the step of receiving the user selection of a depth and a depth highlight range, and wherein the step of identifying the contour comprises the step of identifying a contour area between the depth plus the depth highlight range and the depth minus the depth highlight range, and wherein the step of outputting one or more indications associated with the contour comprises the step of outputting one or more indications associated with the contour area on the display to highlight the contour area.

6. The method of claim 1, wherein the step of receiving the user selection of the at least one depth to be highlighted comprises the step of receiving the user selection of a depth for a water level offset, and wherein the step of identifying the contour comprises the step of identifying each contour line included on the depiction, and wherein the step of outputting one or more indications associated with the contour comprises the step of outputting one or more indications associated with each contour line on the display to highlight the contour area including an adjustment to each contour line by the water level offset.

7. A method for displaying selected features of a chart of a body of water and associated areas, comprising the steps of:
receiving from a user a selected parameter by which to adjust a display of the chart;
highlighting a contour on the chart on the display when the selected parameter is a desired depth highlight;
highlighting a first contour area on the chart on the display when the selected parameter is a desired depth highlight with a depth contour interval corresponding to the desired depth highlight;
highlighting a contour area on the chart on the display when the selected parameter is a range of contiguous depths or a desired depth highlight and a depth highlight range; and
changing displayed depth values on the display for contour lines on the chart when the selected parameter is a water level offset.

8. A method of adjusting depth indications of contour lines on at least a portion of a chart based on a change in water level of a body of water, comprising the steps of:
receiving a water level offset value indicative of a change in water level from a chart water level existing at a time when the chart was made;
mathematically adjusting the depth indications of the contour lines included on the chart based on the water level offset value; and
displaying adjusted depth indications of the contour lines on at least the portion of the chart.

9. The method of claim 8, further comprising the step of displaying area above an adjusted depth of zero as land on the chart.

* * * * *